March 5, 1929.                J. GOOD                1,704,565
BURNER CARBURETOR APPARATUS
Original Filed Nov. 6, 1919
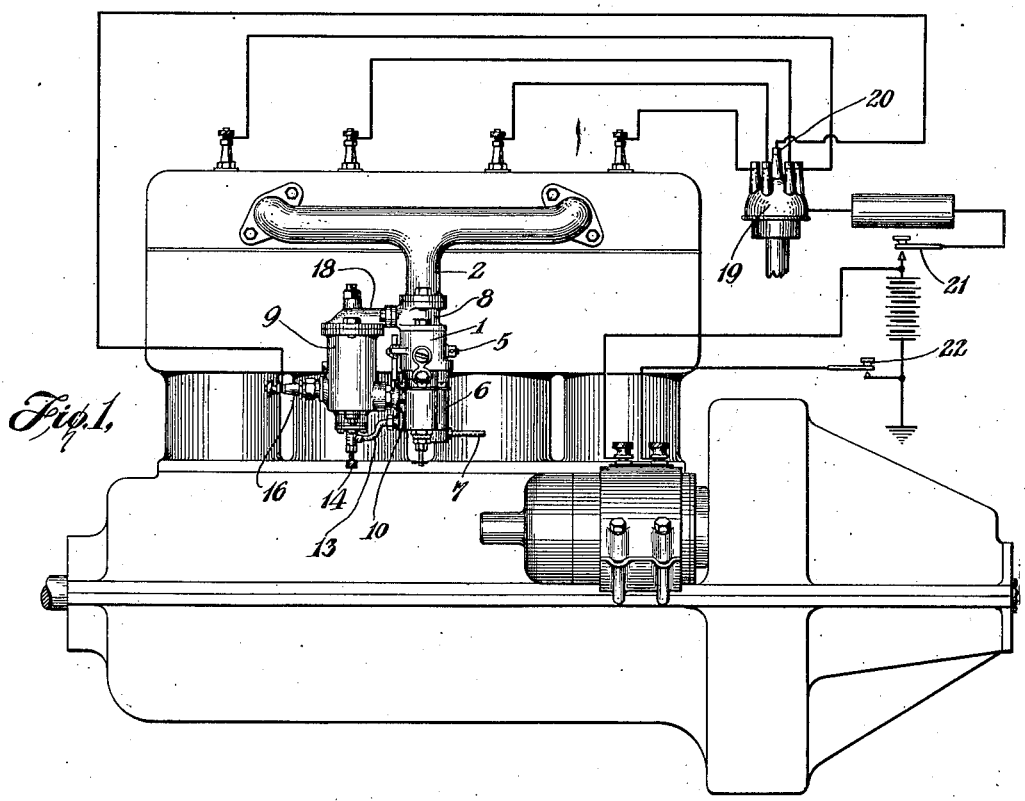
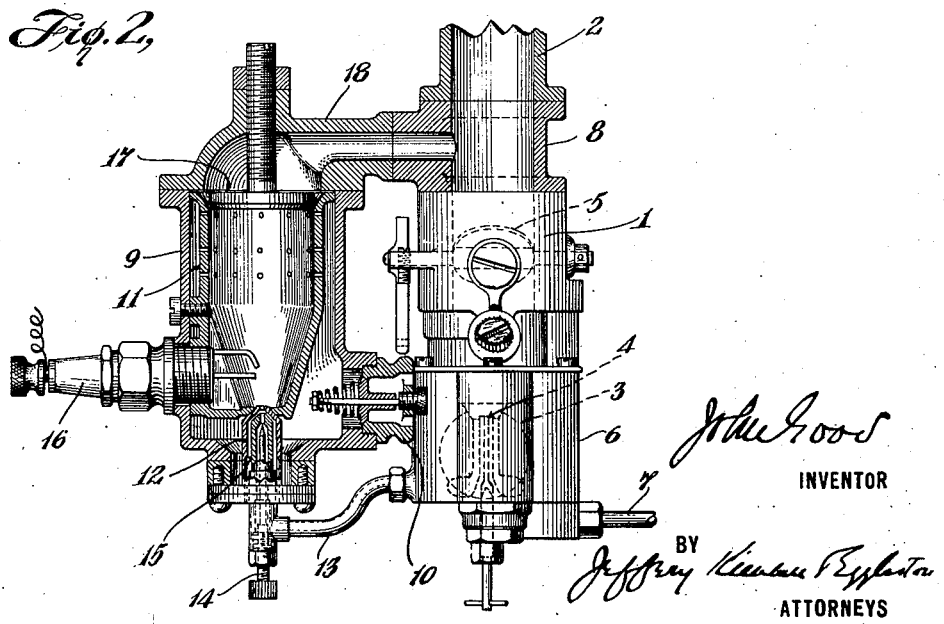

Patented Mar. 5, 1929.

1,704,565

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

BURNER CARBURETOR APPARATUS.

Original application filed November 6, 1919, Serial No. 336,027. Patent No. 1,377,989, dated May 10, 1921. Divided and this application filed April 27, 1921. Serial No. 465,068.

The invention relates to means and method of starting and warming up internal combustion engines, particularly automotive engines, and consists in the combination with the carburetor in such engines of a burner means adapted to furnish a hot, combustible gaseous medium to the engine intake by the aid of which the engine can be promptly started in extremely cold weather and can also be operated with efficiency and elimination of tendency to knock after it is started, and whereby various collateral advantages are attained as will be apparent to those skilled in this art. This application is a division of my co-pending application, now Patent No. 1,377,989, dated May 10th, 1921.

In the accompanying drawing, Figure 1 illustrates an engine with the preferred form of the invention applied thereto and Figure 2 is a larger scale section of said burner means in one of its various forms.

In Figure 1, the engine conventionally illustrated is provided with a carburetor 1 which may be assumed to represent any ordinary or suitable carburetor. It is connected with the intake header 2 and has an air entrance 3, a spray nozzle 4, a throttle 5, all indicated in dotted lines, and also other usual parts, including a liquid receptacle 6 supplied by a fuel line 7 and connected to the nozzle 4 under the control of a needle valve, all of these parts being arranged as customary to deliver an engine-operating mixture of liquid fuel and air into the intake for combustion in the engine, and as will be understood.

The carburetor is secured to the flanged end of the intake 2 by means of an interposed adapter piece 8, which in the present case constitutes the connection for the burner, although the latter may be otherwise connected to the intake passage as will later appear. The burner as shown, comprises an outside casing 9, provided with a spring seated air entrance valve 10, an interior perforated sleeve or shell 11 and a central spray nozzle 12. The latter is connected by a duct or pipe 13 with the carburetor fuel receptacle 6 and provided with a liquid orifice which is adjustably controlled by the needle valve 14. The burner spray nozzle is further associated with one or more small air entrance channels 15, conducting air direct from atmosphere in such relation as to shatter the liquid fuel jet to a fine state of atomization. The resulting spray is ignited by an electric igniter or spark plug 16, the spark gap of which is located in the path of the spray so as to produce ignition thereof prior to its admixture with the larger volume of air inflowing from the air valve 10 through the perforations in the shell 11. This mode of admitting the fuel and air provides for reliable and non-explosive ignition even of heavy fuels, such as kerosene, and continuous subsequent combustion, because the fuel and air are not immediately thoroughly mixed together and the ignition occurs at a point where such non-homogeneous mixture is relatively rich in fuel, as explained in my copending application above referred to. A similar nonhomogeneous mixture condition can be secured by other mechanical arrangements for bringing the fuel and air together in the ignition space of the burner. The fuel and air are drawn into the burner by the suction effect transmitted thereto from the intake pipe when the engine is being rotated by its normal starting agency, or is in rotation by its own operation. The outlet from the combustion space of the burner is governed by a disc 17, adjustably mounted by screw threads in the outlet part 18 and co-acting with the wall at the upper end of the combustion space to form an annular crevice therewith, the width of which may be greater or less according to its adjustment as will be plain from the drawing. The function of this outlet crevice is to extinguish or pinch off the flame so that only hot non-flaming gases shall pass to the intake, and any other means suitable for this purpose or adapted to produce an equivalent effect, may be used in substitution thereof. The total area of the passage past the disc may obviously be made as large as desired by proper selection of the diameter of the annular crevice, without impairing its flame-extinguishing action. The spring of valve 10 and the liquid delivery permitted by the setting of needle valve 14 are correlated to cause the burner to receive proportions adapted to burn without any great excess of either fuel or air and which may be said to be explosive proportions since the adjustment may be, and preferably is, quite the same as the adjustment of proportions made in the carburetor. This mixture producing means is in effect a small auxiliary carburetor, operating independently of the main carburetor and the combustion space or burner proper constitutes a heater to heat and vaporize the fuel delivered by such auxiliary carburetor. The mixture proportions of the latter are preserved throughout the full range of its operation, this being the effect of the air valve spring, that is to say, the proportions of fuel and air admitted to the burner are substantially the same under moderate suction and low burning as under strong suction effects or higher burning rates. The utilization of an air valve for this purpose is one of several so-called compensating means which might be used for maintaining substantially constant proportions. The combustion thus started in the burner is not allowed to become complete because the burning gases are immediately drawn into the flame-extinguishing crevice above described before all of the hydro-carbons in the mixture have had an opportunity to combine. A part of the mixture produced by the auxiliary carburetor device is thus burned for the purpose of heating the other part of such mixture, and the heated part and the burned part are then conducted, together in the present case, through the adapter piece 8 to the intake, where they are admixed with the main carburetor mixture resulting in an ultimate mixture which is particularly efficient and clean burning. The engine may be operated on this hot medium, admitted through the adapter, for starting to the exclusion of any mixture from the carburetor, although it may be preferred to admit mixture from the carburetor at the same time so that the heat of said partially-burned medium may serve to vaporize the liquid fuel of the carburetor mixture. This adapts the engine to be put immediately under heavier loads than the auxiliary carburetor might of itself be adapted to carry, unless made of considerably larger capacity. The temperature of the burner products, available for vaporizing purposes, depends upon the time period allowed for the partial combustion and as represented by the distance between the source of the flame from the flame-extinguishing crevice and, other conditions being equal, the temperature can be varied by the adjustment of that dimension of the burner. Conversely, the fuel value of the auxiliary mixture varies inversely to the extent of combustion that is permitted, it being obvious that the more is burned for heating the less will be left to form a combustible medium. It is found satisfactory to permit about fifty per cent of the fuel to be burned for heat purposes, but this, of course, is subject to circumstances, it being desirable that when the main carburetor and burner deliver mixture simultaneously to the engine, that enough heat shall be supplied to the main carburetor mixture to avoid the entrance of an undesirable amount of fuel in liquid form into the engine cylinders, as this might result in contaminating the lubricating oil with gasoline or kerosene. Some variation in the proportions admitted to the burner is permissible; it might for instance be run richer than would accommodate complete combustion, but this is generally found objectionable either because of the tendency to form soot or because it requires a corresponding compensatory adjustment of the proportions of the main carburetor, or the equivalent, in order that the engine shall receive, at all times, the most efficient working proportions of fuel and air.

In the apparatus illustrated the auxiliary carburetor is connected to the intake between the engine throttle and the engine and is therefore subject to such variation of suction effect as commonly occurs at that point and thereby it is caused to deliver fuel mixture at a higher rate when the engine throttle is partly closed, or when the engine is idling, than it does when the throttle is more widely opened, and it may cease its function entirely when the engine is under full load if at such time the suction effect is less than that required for burner operation. It will be obvious however that such a carburetor as above described may be connected to the engine intake at either side of the engine throttle, and in fact at either side of the spray nozzle of the main carburetor, so long as adequate suction is imparted to it to cause its operation at starting or when the hot medium is desired.

The starting agency is shown in Fig. 1 as an electric motor operated by a storage battery under the control of a starting switch 22. The same battery may also supply current for the ignition system of the engine which comprises the usual distributor head 19 provided in this instance with an extra point 20 from which a lead is taken to the burner spark plug 16. It will be apparent that by closing the ignition switch 21 and also the starting switch 22, the engine will be cranked over coincidently with the energization of the igniter, so that the burner thus comes into operation without special attention or any unusual or extraordinary manipulation on the part of the engine operator. If the engine throttle 5 be tightly closed when the engine is cranked, it may take up its combustion operation solely on the partially burned gases produced by the burner as above alluded to, or the engine may be and preferably is started on a heated mixture produced by the mixing of such partially burned gases with the normal carburetor mixture, in which event the heat of said gases serves to vaporize and thus perfect the mixture from the carburetor to the end of producing a quick start of the engine as will now be apparent.

It will be noted that this effect is the result of commingling two mixtures of fuel and air, one of the mixtures being an ignited mixture in the sense that it has been partially burned and still contains unburned fuel and the other being unignited, and that, so far as the character of the ultimate engine-operating medium is concerned, it is inconsequential what the sources of said mixtures may have been or how they were produced, although the means for that purpose as herein disclosed is preferred for obvious reasons.

It will be noted further that this invention differs from certain other types of carburetor burners in that the delivery of hot engine starting mixture to the engine does not depend on the suction discharge of liquid fuel by the main carburetor into the region of the intake which is heated by the burner, which region is frequently at a higher level than the carburetor fuel bowl, but merely depends on the discharge of sufficient liquid into the burner to produce combustion therein. In consequence, a relatively feeble suction effect, as on slow cranking, is sufficient to cause the passage of hot mixture to the engine because it is required only to lift gaseous and not liquid fuel.

Claims—

1. The method of operating an internal combustion engine which comprises causing engine suction to produce two independent mixtures of liquid fuel and air, burning part of one of said mixtures, combining the unburned part and the product of combustion with the other mixture and conducting all to the combustion space of the engine.

2. The method of operating internal combustion engines which comprises causing the engine suction to maintain continuous delivery of liquid fuel and air into each of two carburetors, maintaining completely combustible proportions in the mixtures delivered by each of said carburetors, burning part of one of said mixtures, utilizing the combustion thereof for heating the unburned part of that mixture and the other mixture, and conducting all to the combustion space of the engine.

3. The combination in an engine, of a main carburetor and another carburetor, both operated by the engine suction, means for heating part of the mixture of the latter carburetor by combustion of the other part thereof, and means whereby the heated part and the combustion products of the other part are admixed with the main carburetor mixture and conducted to the engine.

4. The combination in an engine, of a main carburetor and another carburetor, means for heating a part of the mixture of the latter carburetor by combustion of the other part thereof, means for varying the proportion of the mixture of said latter carburetor which is burned, and means whereby the heated part and the burned part are admixed with the main carburetor mixture and conducted to the engine.

5. The combination in an engine, of a main carburetor and another carburetor, means for heating part of the mixture of the latter carburetor by combustion of the other part thereof, said means comprising or including an electric igniter, and means whereby the heated part and the burned part are admixed with the main carburetor mixture and conducted to the engine.

6. In an internal combustion engine the combination of the engine intake and carburetor, of means connected with the intake and operating independently of said carburetor for producing and introducing into the carburetor mixture, combustion products and a combustible gaseous medium.

7. In an internal combustion engine the combination of the engine intake and engine carburetor, of an auxiliary carburetor, means for electrically igniting and burning part of the mixture produced thereby, the remaining unburned part being adapted for idling the engine and means for conducting both parts to said intake.

8. In an internal combustion engine the combination with the engine carburetor, of means independent thereof for producing hot combustion products and a gaseous combustible medium, a single fuel feed for said means independent of the carburetor feed and means for conducting said products and medium to the engine intake for mixture therein with the mixture from said engine carburetor.

9. In an internal combustion engine, the combination with a carburetor capable of operating the engine and a burner, the latter comprising means for cutting off the flame therein prior to its complete combustion, and both being connected to the engine intake for successive or simultaneous operation by the suction therein.

10. In an internal combustion engine, two carburetors connected to the engine intake, one of them being provided with a combustion space and an igniter and adapted to deliver hot engine-operating mixture to the engine.

11. In an internal combustion engine, two carburetors, one of them being provided with a combustion space and an igniter and delivering hot engine-operating mixture to the engine during the normal working condition thereof.

12. In an internal combustion engine, two carburetor devices supplied from the same fuel source, and means whereby one of them delivers a hot engine-operating mixture of combustion products and unburned fuel to the engine.

13. In an internal combustion engine, an intake passage, a main carburetor and an engine-controlling throttle therefor, in combination with another carburetor adapted to deliver hot engine-operating mixture and connected to the intake passage on the engine side of said throttle.

14. In an internal combustion engine, the combination of a hot-mixture producing means and an independent cold mixture producing means, one of said mixtures including combustion products and both including engine-operating-fuel.

15. In an internal combustion engine, means for supplying the same with combustible mixture comprising the combination of a carburetor, a liquid fuel combustion device and an auxiliary fuel supply device co-operating with the carburetor to supply fuel to the engine for the normal working operation thereof.

16. The combination in an engine, of the engine intake including a carburetor and a throttle, an auxiliary fuel supply delivering to said intake on the engine side of said throttle, said carburetor and auxiliary fuel supply being adapted for coincident action to furnish combustible mixture for the operation of the engine under load, and a combustion device associated with said auxiliary supply to supply heat to said combustible mixture.

17. In an engine having a carburetor, the combination of an auxiliary fuel jet and a combustion heater coacting therewith to produce a dry mixture containing fuel from said jet, hot combustion products and air, and means to admit such mixture to the mixture produced by said carburetor.

18. In an internal combustion engine, the combination with a carburetor, a liquid fuel burner operated by the suction effect of the engine, an auxiliary fuel supply, and means whereby the carburetor mixture, the burner products and said auxiliary fuel are all conducted together to the engine for operating the latter.

19. In an internal combustion engine, the combination with a carburetor having a fuel receptacle, a suction burner and auxiliary fuel supply all adapted to deliver to the engine intake, said burner and auxiliary fuel supply being organized in a structure including an adapter fitting adapted for connection to the intake manifold of an existing engine and having a fuel duct for connection to said carburetor fuel receptacle.

20. The combination in an internal combustion engine, of a carburetor, a structure comprising a suction-operated burner and an auxiliary fuel supply adapted for connection as an attachment to the engine intake and having a common outlet to said intake.

21. In a hydrocarbon motor the combination with the intake conduit thereof, of a main carburetor connected to said conduit, a combustion heater for supplying heat to said conduit, and an auxiliary carburetor connected to said conduit for idling the motor and to said heater.

22. In a hydrocarbon motor, the combination with a motor intake conduit, of means for supplying mixture thereto for normal running, and means for supplying mixture to the conduit for idling, and a heater device for said idling supply means.

In testimony whereof, I have signed this specification.

JOHN GOOD.